United States Patent [19]

Jensen et al.

[11] 4,396,318

[45] Aug. 2, 1983

[54] COLLET-TYPE DRILL

[75] Inventors: Sam C. Jensen, Glendora; Robert M. McClure, Norco, both of Calif.

[73] Assignee: Dresser Industries, Inc., Dallas, Tex.

[21] Appl. No.: 294,662

[22] Filed: Aug. 20, 1981

[51] Int. Cl.[3] .............................................. B23B 45/14

[52] U.S. Cl. ........................................ 408/95; 173/32; 269/24; 269/32; 269/47; 269/153; 408/79

[58] Field of Search ..................... 408/79, 95, 97, 107; 269/47, 48.1, 153, 24, 32; 173/31, 32

[56] References Cited

U.S. PATENT DOCUMENTS

| | | | |
|---|---|---|---|
| 2,909,949 | 10/1959 | Winslow | 408/95 |
| 2,911,860 | 11/1959 | Winslow et al. | 408/79 |
| 3,599,958 | 8/1971 | Schindler | 408/79 |
| 3,663,115 | 5/1972 | Vindez et al. | 408/79 |

*Primary Examiner*—Robert E. Garrett

*Assistant Examiner*—Jerry Kearns

*Attorney, Agent, or Firm*—Roy L. Van Winkle

[57] ABSTRACT

The collet-type drill includes improved clamping means having a pressure foot member that is in engagement with the work piece. The pressure foot member is connected with a drill motor and with a feed means. A collet is operably connected to and movable relative to the foot member, and when actuated, connects the drill to the work piece. A clamp bushing has one end pivotally connected with the collet and encircles a cylindrical sleeve that has a transverse slot extending therethrough. The bushing is connected to the pressure foot member. A clamping piston extends through the sleeve and carries a connecting pin that extends through the slot in the sleeve into the clamp bushing whereby the bushing and collet are movable together in response to movement of the clamping piston to force the collet into holding engagement with the work piece.

3 Claims, 6 Drawing Figures

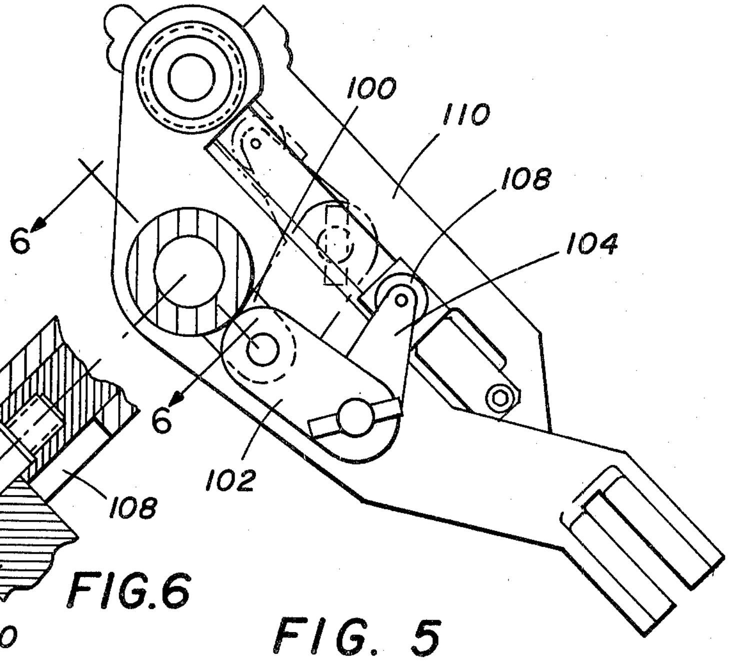
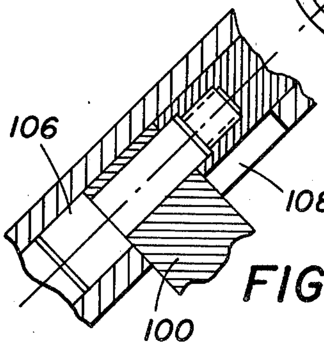
FIG.6
FIG. 5
PRIOR ART
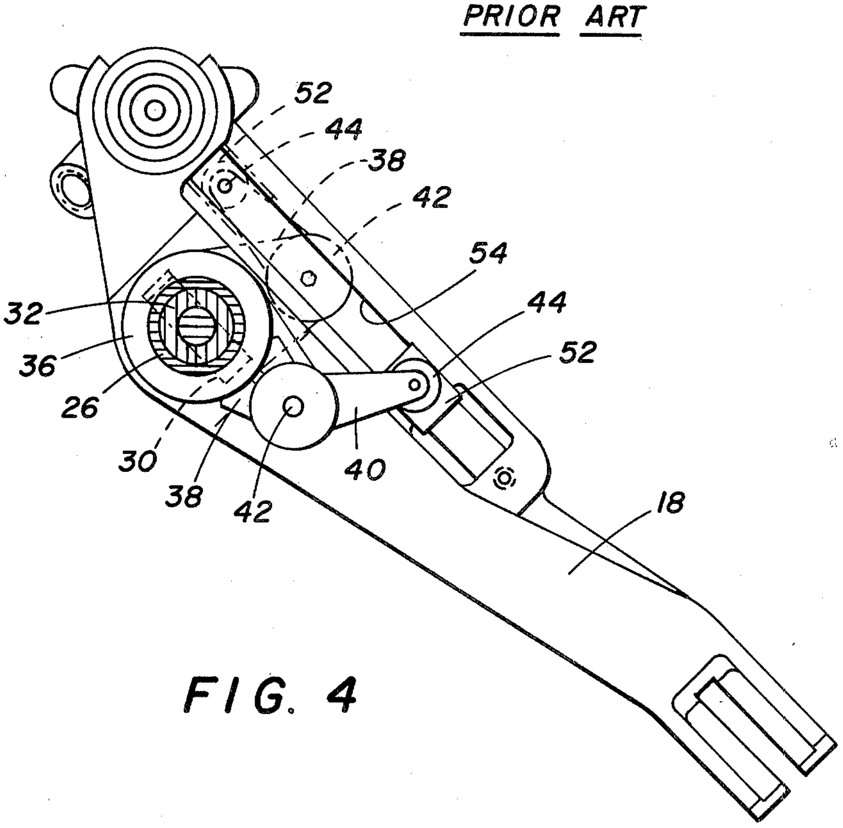
FIG. 4

COLLET-TYPE DRILL

BACKGROUND OF THE INVENTION

This invention relates generally to an improved collet-type drill. More particularly, but not by way of limitation, this invention relates to an improved collet-type drill that includes connecting means between the drill and pressure foot that reduces bending and binding forces thereon, permitting higher clamping forces than previously available.

In the aircraft industry in particular, many thousands of holes have to be drilled, and frequently countersunk, in the surfaces of the aircraft. Such holes must be very accurate in size and location. Collet-type drills have been developed which utilize a pressure foot attached to the drill that is connected by a collet to the surface to be drilled.

It is inconvenient to be able to drill only one hole when the drill has been attached to surface by means of the collet. Thus, there has also been developed a means for moving the drill relative to the collet hole while the pressure foot remains clamped to the surface.

One such drill has been developed by Omark Industries and is partially illustrated in FIGS. 4 and 5. While this drill has performed reasonably satisfactory, the use of more difficult to drill materials has lead to the necessity for greater clamping forces, while at the same time, maintaining the ease of adjustment so that multiple holes can be drilled from a single clamping site.

Therefore, an object of this invention to provide an improved collet-type drill that permits ease of articulation so that multiple holes can be drilled from one clamping site while at the same time, providing much higher clamping forces than previously available to assure accuracy of the holes.

SUMMARY OF THE INVENTION

This invention provides an improved collet type drill that includes a drill motor, a drill bit rotatably driven by the motor, and feed means for moving the bit toward and away from the work piece, which has a pre-formed collet hole therein, and into which the holes are to be drilled. The improvement comprises a clamping means including a pressure foot member that is engageable with the work piece and arranged for connection with the drill motor and with the feed means; collet means operably connected to and movable relative to the foot member; and, a clamp bushing having one end pivotally connected with the collet means and having an annular end portion, which end portion has an annular groove formed in the inner periphery thereof. A cylindrical sleeve forms part of the feed means and extends through the clamp bushing and is connected to the pressure foot member. The sleeve has a transverse slot extending therethrough. A clamping piston includes an elongated clamping rod movably disposed in the sleeve and having a transverse hole extending therethrough. A connecting pin is disposed in the transverse hole and projects through the transverse slot into the annular groove in the clamp bushing whereby the bushing, collet holder, collet and rod are movable together, upon movement of said clamping piston to engage the collet means with the work piece to secure the drill to the work piece.

BRIEF DESCRIPTION OF THE DRAWING

The foregoing objects and advantages of the invention will become more apparent as the following detailed description is read in conjunction with the accompanying drawing, wherein like reference characters denote like parts in all views, and wherein:

FIG. 4 is a view partly in top elevation and partly in cross-section of part of the clamping mechanism of the drill of FIG. 1 that is constructed in accordance with the invention;

FIG. 5 is a view partly in cross-section, partly in top elevation of a prior art clamping mechanism; and, FIG. 6 is a partial cross-sectional view of a portion of the clamping mechanism of FIG. 5 taken generally along the line 6—6 of FIG. 5.

DETAILED DESCRIPTION OF THE PREFERRED EMBODIMENT

Figure 1:
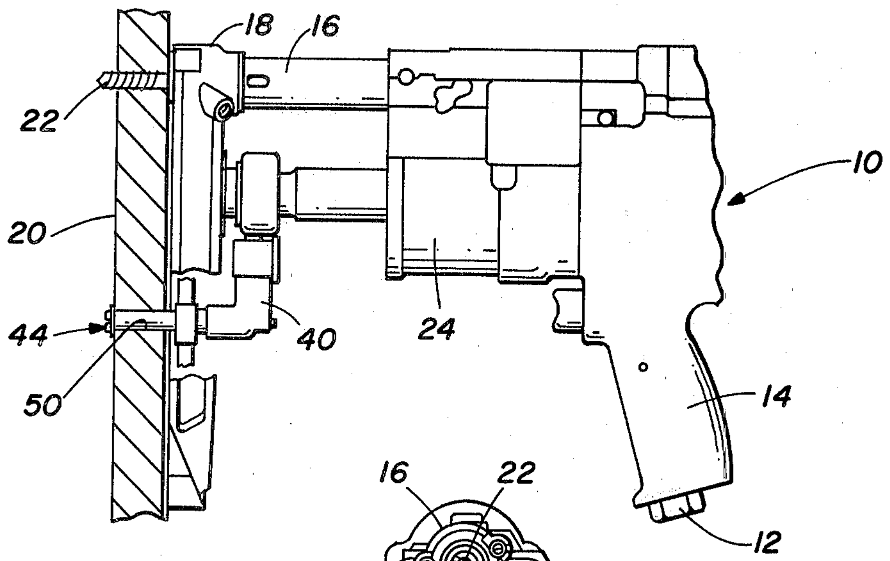
FIG. 1 is a side view of a collet-type drill incorporating a clamping mechanism that is constructed in accordance with the invention.
Figure 2:
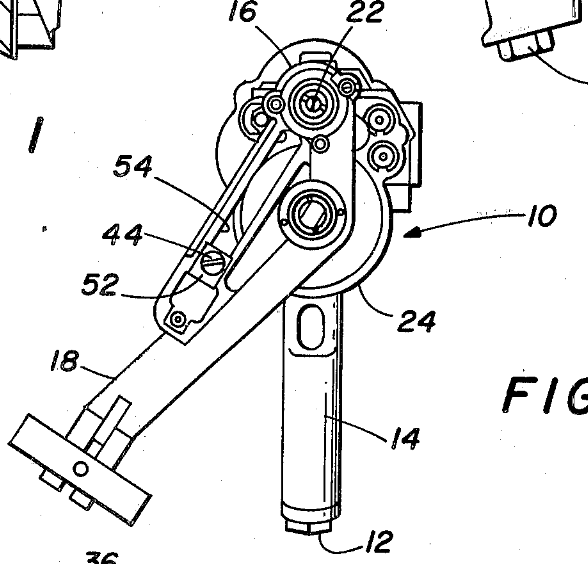
FIG. 2 is a front plan view of the drill of FIG. 1 with the work piece removed.

Referring to the drawing, and to FIGS. 1 and 2 in particular, shown therein and generally designated by the reference character 10, is a collet-type drill. The drill 10 illustrated is of the pneumatic type and, when in operation, would normally be connected to an air supply at the fitting 12 located in the handle 14. A nose portion 16 of the drill 10 is fitted with a pressure foot 18 that will be described in detail hereinafter.

As illustrated in FIG. 1, the drill 10 is attached to a work piece shown in cross section and designated by the reference character 20. A drill bit 22 projects from the drill 10 through the work piece 20.

The drill 10 also includes a clamping and feeding mechanism 24 which functions to apply pressure to the drill bit 22 as it rotated by the drill 10, forcing the drill bit 22 through the work piece 20.

The clamping mechanism 24 (See FIGS. 3 and 4) includes a clamping sleeve 26 projecting therefrom toward the work piece 20. A slot 28 extends transversely through the sleeve 26 for receiving a connecting pin 30. The connecting pin 30 also extends through a clamping piston 32 that is slidable within the sleeve 26. For applying large forces during the clamping operation, the clamping piston 32 includes an enlarged piston end 33.

The ends of the connecting pin 30 terminate in an annular recess 34 that is located in the inner periphery of a clamp bushing 36. The annular recess 34 permits the clamp bushing 36 to pivot about the sleeve 26 and the connecting pin 30. The opposite end 38 of the bushing 36 is pivotally connected to a collet holder 40 by means of pivot pin 42.

The collet holder 40 pivotally supports a collet 44. It will be noted that the split outer portion 46 of the collet 44 is rotatable within the collet holder 40, while a collet actuating member 48 is threadedly attached to the collet holder 40. This arrangement permits relative longitudinal movement between the outer collet portion 46 and the collet actuating member 48 to set and release the collet 44. The collet 44 is constructed and operates in a manner familiar to those who work in the field of collet-type drills.

Figure 3:
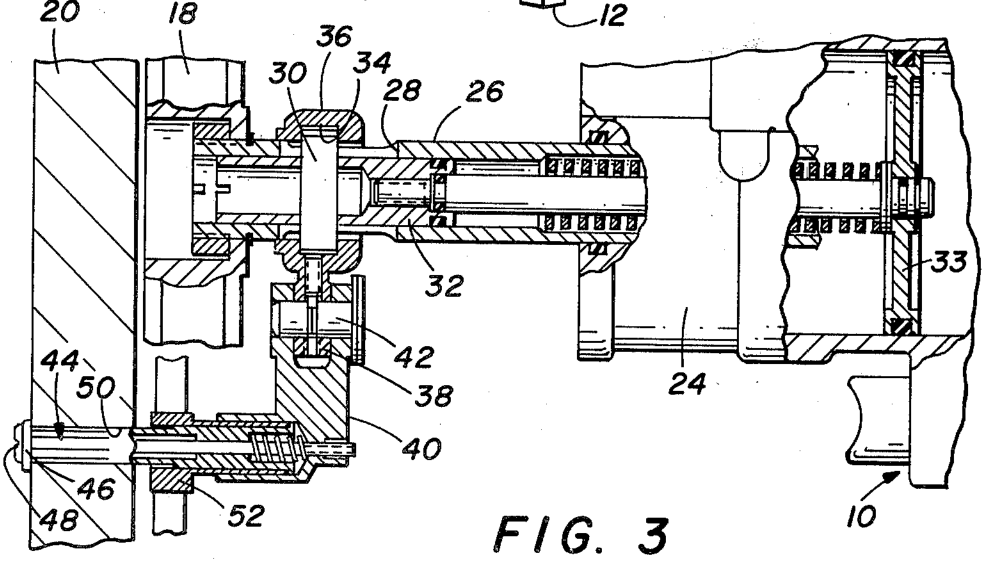
FIG. 3 is an enlarged view, partly in cross-section and partly in elevation, illustrating the improved clamping mechanism of the invention.

As illustrated in FIG. 3, the collet 44 extends through a preformed hole 50 in the work piece 20 and when disposed therein and actuated, locks or clamps the pressure foot 18 and drill 10 to the surface of the work piece 20.

As can be seen more clearly in FIG. 4, the collet 44 extends through a collet guide member 52. The collet guide member 52 is slidable along an elongated track or collet guide way 54 that is formed in the pressure foot 18.

The versatility of the drill 20 can be appreciated when it realized that the collet 44 can be positioned anywhere along the guide way 54 from one extreme end as illustrated by the solid lines in FIG. 4 to the opposite extreme end as illustrated by the dashed lines. Such articulation is possible because of the structural arrangement of the clamp bushing 36 and the connecting pin 30.

Furthermore, it is possible with the collet-type drill 10 illustrated, to apply extremely high clamping forces, e.g., in the neighborhood of 800 to 900 pounds of thrust, and still maintain the ability to move the drill 10 about the hole 50 for purpose of drilling numerous holes from the one collet hole 50. The clamping mechanism 24 is equally loaded through the connecting pin 30, since both ends disposed within the annular recess 34 in the clamp bushing 36.

When it is desired to use the drill 10, the collet 44 is inserted in the pre-drilled hole 50 in the work piece 20. The drill 10 is then actuated by depressing the trigger operated valve (not shown) in the handle 14 admitting air to the clamping mechanism 24. More specifically, air enters the mechanism 24 under the enlarged piston end 33 on the clamping piston 32 pulling upwardly on the connecting pin 30, lifting the clamp bushing 36 and collet support 40 upwardly, and expanding the outer portion 46 of the collet 44 into tight holding engagement with the work piece 20. The same force creates a reaction force on the pressure foot 18 forcing it downwardly into tight holding engagement with the surface of the work piece 20. The drill 10 is then appropriately actuated to cause the drill bit 22 to penetrate or enter the work piece 20 to the desired depth.

After a drilled hole has been formed, the pressure is released and the drill 10 moved to a new location while keeping the collet 44 in the hole 50 until all the holes within the range of the drill 10 around the hole 50 have been drilled.

The specific differences and advantages of the drill 10 over the prior art devices available can be appreciated by comparing the foregoing with the mechanism illustrated in FIGS. 5 and 6. The drill 10 has a greater coverage for the same size mechanism than does the device of FIG. 5. It is necessary to provide three links 100, 102 and 104 to connect the clamping mechanism 106 to the collet 108 in the prior art device to provide similar articulation. In FIG. 6, it can be seen that the linkage 100 is connected directly to the clamping mechanism 106 and projects through a slot 108 in the wall clamping mechanism so that the linkage 100 cannot pivot thereabout. Consequently, it is necessary to provide the intermediate link 102 to permit the articulation necessary to move the collet 108 along the pressure foot 110.

Forces of only 300–400 pounds of thrust are available through the mechanism illustrated in FIGS. 5 and 6. This is the result of the linkage 100 being cantilevered on the clamping mechanism 106. The mechanism has a tendency to cock and bind when extreme forces are exerted thereon. This structure has been improved by the clamp bushing/connecting pin arrangement 36 and 30 of FIG. 3, wherein the loads are taken on each end of the pin 30, eliminating the tendency for the mechanism to cock and bind when high clamping forces are placed thereon.

From the foregoing detailed description, it will be appreciated that the collet-type drill 10 of this invention is superior to any previously known collet-type drill, because it permits considerably higher clamping forces and thrust forces to be applied when attaching the drill to the work piece and when drilling the harder materials prevelant in the air craft structures of today, and further, because with the same size and general type of mechanism, there is more movement available, allowing more holes to be drilled from the same collet location.

Having described but a single embodiment of the invention, it will be appreciated that many changes and modifications can be made thereto, without departing from the spirit or scpe of the invention.

The embodiments of the invention in which an exclusive property or privilege is claimed are defined as follows:

1. An improved collet-type drill including a drill motor, a drill bit rotatably driven by the motor and feed means for moving the bit toward and away from a workpiece having a pre-formed collet hole therein and in which holes are to be drilled, the improvement comprising clamping means including:

a pressure foot member engageable with the work piece and arranged for connection with the drill motor and with the feed means;

collet means operably connected to and movable relative to said foot member;

a clamp bushing having one end pivotally connected with said collet means and having an annular end portion, said end portion having an inner periphery and having an annular groove formed in said inner periphery;

a cylindrical sleeve forming part of said feed means extending through said clamp bushing and connected to said pressure foot member, said sleeve having a transverse slot extending therethrough;

a clamping piston including an elongated clamping rod movably disposed in said sleeve, said rod having a transverse hole extending therethrough; and, a connecting pin disposed in said transverse hole and projecting through said transverse slot into the annular groove in said clamp bushing whereby said bushing, collet holder, collet and rod are movable together upon movement of said clamping piston to engage said collet means with the workpiece to secure said drill to the workpiece.

2. The improved drill of claim 1 wherein said collet means includes:

a collet;

collet guide means for movably supporting said collet on said foot member; and a collet holder pivotally located on said collet guide means and pivotally connected to said clamp bushing.

3. The improved drill of claim 2 and wherein:

said foot member includes an elongated collet guide way; and said collet guide means includes a slide member slidingly located on said guide way.

* * * * *